(12) United States Patent
Mladinich

(10) Patent No.: US 7,803,204 B1
(45) Date of Patent: Sep. 28, 2010

(54) FOREIGN OBJECT DEFLECTOR FOR JET ENGINE

(76) Inventor: Julius C. Mladinich, 455 Diamond Spring Rd., Apt. 305, Denville, NJ (US) 07834

( * ) Notice: Subject to any disclaimer, the term of this patent is extended or adjusted under 35 U.S.C. 154(b) by 0 days.

(21) Appl. No.: 12/581,335

(22) Filed: Oct. 19, 2009

(51) Int. Cl.
B01D 39/00 (2006.01)

(52) U.S. Cl. .......................... 55/306; 55/434; 55/385.1; 55/490; 55/505; 95/267; 244/136; 244/53 B; 60/39.092; 60/614

(58) Field of Classification Search .................. 55/306, 55/434, 385.1, 490, 505; 95/267; 181/214, 181/276; 244/136, 53 B; 60/39.092, 614
See application file for complete search history.

(56) References Cited

U.S. PATENT DOCUMENTS

| | | | |
|---|---|---|---|
| 2,553,512 A | 5/1951 | Cotton, Jr. | |
| 2,623,610 A | 12/1952 | Buechel | |
| 2,618,358 A | 11/1953 | Newcomb | |
| 2,704,136 A | 3/1955 | Rainbow | |
| 2,814,454 A | 11/1957 | Atkins et al. | |
| 2,944,631 A | 7/1960 | Kerry et al. | |
| 2,969,941 A | 1/1961 | Hobart, Jr. | |
| 3,121,545 A | 2/1964 | Meletiou | |
| 3,196,598 A | 7/1965 | Olson | |
| 3,319,402 A | 5/1967 | Ritchie | |
| 3,333,794 A * | 8/1967 | Lewis | 244/53 B |
| 3,352,104 A | 11/1967 | Duerr | |
| 3,369,776 A * | 2/1968 | Puryear | 244/53 B |
| 3,400,902 A | 9/1968 | King | |
| 3,474,988 A | 10/1969 | Cox et al. | |
| 3,537,240 A | 11/1970 | Weidinger et al. | |
| 3,572,028 A | 3/1971 | Taylor | |
| 3,733,814 A | 5/1973 | Hull, Jr. et al. | |
| 3,871,844 A | 3/1975 | Calvin, Sr. | |
| 4,149,689 A | 4/1979 | McDonald | |
| 4,354,348 A | 10/1982 | Wooding | |
| 4,617,028 A | 10/1986 | Ray et al. | |
| 4,833,879 A | 5/1989 | Verduya et al. | |
| 5,411,224 A | 5/1995 | Dearman et al. | |
| 5,549,259 A | 8/1996 | Herlik | |
| D433,029 S | 10/2000 | Eidson | |
| 6,138,950 A * | 10/2000 | Wainfan et al. | 244/53 B |
| 6,193,011 B1 | 2/2001 | Harris | |
| 6,595,742 B2 * | 7/2003 | Scimone | 415/121.2 |
| 6,598,384 B1 | 7/2003 | Adkins | |
| 7,192,462 B2 | 3/2007 | Stelzer et al. | |
| 7,494,522 B2 * | 2/2009 | Pavlatos | 55/306 |
| 2004/0195437 A1 * | 10/2004 | Garric | 244/53 B |

(Continued)

*Primary Examiner*—Jason M Greene
*Assistant Examiner*—Dung Bui
(74) *Attorney, Agent, or Firm*—Benjamin Appelbaum

(57) ABSTRACT

A deflector for an aircraft engine comprises a screen attached to a base, a connector connecting the base and the engine, a mechanism to limit the movement of the connector and base, a spring that has two ends, one end being attached to the base inside surface, the spring extending past the base, and the spring's other end is positioned proximate the screen; and a shock absorbing means attached to the base, and connects the base with the engine, whereby when a foreign object contacts the deflector with a force sufficient force to move the spring and the shock absorbing means, the screen, the spring and the shock absorbing means are urged towards the engine, the movement of the screen and the spring being controlled by the shock absorbing means and the limiting mechanism, preventing the foreign object, such as a bird, from entering the engine.

20 Claims, 9 Drawing Sheets

U.S. PATENT DOCUMENTS

2007/0025838 A1* 2/2007 Stelzer .................... 415/121.2
2007/0059169 A1   3/2007 Barnett et al.
2009/0261208 A1* 10/2009 Belyew .................... 244/53 B

* cited by examiner

FOREIGN OBJECT DEFLECTOR FOR JET ENGINE

FIELD OF THE INVENTION

Embodiments of the present invention relate to a foreign object deflector for use in conjunction with aircraft engines. An embodiment is designed to prevent the entry of foreign objects, such as birds, into the jet engine of an aircraft, particularly during flight. These embodiments could be used on fixed wing aircraft, such as jet planes, and other embodiments could be adapted for use on rotor craft (also referred to as rotary-wing aircraft), such as helicopters, and other airframes that are capable of vertical take-offs and landings.

BACKGROUND OF THE INVENTION

In January 2009, a twin engine jet aircraft that had recently taken off from a New York City area airport had a collision with a flock of geese. Numerous geese were sucked into the engines and caused both engines to fail, but the pilot was able to maneuver the aircraft into a safe landing on the Hudson River. Everybody survived this crash, and there were no serious injuries; government agencies concluded that this crash was caused by the intake of birds into the engines. In the few months since this incident, there have been an increasing number of news reports about birds striking aircraft, and that overall, the number of bird strikes has been increasing over the past few years. Some of this increase is due, in part to additional protections for wildlife, and the location of many airports near bodies of water where birds are resident.

However, the incidence of bird strikes and resultant airplane crashes are far from recent occurrences. For example, in the prior art U.S. Pat. No. 3,121,545 (Meletiou) refers to a plane crash near Boston in the early 1960's that was caused by the ingestion of a flock of starlings, and discloses a rotary deflector for aircraft engine intakes.

King (U.S. Pat. No. 3,400,902) discloses a moveable anti-ingestion screen mounted within an engine's intake.

McDonald (U.S. Pat. No. 4,149,689) discloses a protective screen for a jet-engine intake.

Wooding (U.S. Pat. No. 4,354,346) discloses an air intake that will allow a bird to enter, and to become smaller pieces that will fit in the engine. The Abstract states that to minimize damage to the engine, the surface region is formed such that the bird is retarded by it, and eviscerated so as to produce bird debris of a sufficiently low density to be safely ingested by the engine.

Ray et al. (U.S. Pat. No. 4,617,028) disclose an aircraft engine air intake including a foreign object separator in which relatively large foreign objects, such as medium size birds that enter the inlet aperture, will be unable to navigate the first bend in the intermediate portion of the intake and thus not be able to enter the engine.

Dearman et al. (U.S. Pat. No. 5,411,224) discloses a conically shaped guard apparatus for the intake of a jet engine.

In U.S. Pat. No. 5,549,259 Herlik discloses use of a deflector fitted over the engine intakes and designed to deflect large birds away from the engine.

Barnett et al. (U.S. Pat. App. No. 2007/0059169 A1) focuses on making engine components that are resistant to impact damage.

Pavlatos (U.S. Pat. No. 7,494,522 B2) discloses a number of different embodiments of devices that can be used as either a guard, a cap, or a screen for use on the air intakes of jet engines.

But none of the prior art references utilize the combination of a screen and shock absorbing mechanism employed in embodiments of the present invention. As will be shown in other sections of this specification, these embodiments could be used on aircraft used for civilian and/or military purposes. In addition to their use on fixed wing aircraft, such as jet planes, embodiments of the present invention could be adapted for use on rotor craft (also referred to as rotary-wing aircraft), such as helicopters, and other airframes that are capable of vertical take-offs and landings.

BRIEF SUMMARY OF THE INVENTION

As will be seen in the detailed description section, embodiments of the present invention offer numerous advantages, such as the following:
  Ability to save lives;
  Reduction of aircraft maintenance costs;
  Applicability to both civilian and military aircraft; and
  Ability to stimulate the economy by the creation of jobs, either through the installation of units on existing jet engines, as well as their installation on newly manufactured engines.

Embodiments of the present invention can be mounted onto engines having cowlings, and whose cowlings may or may not contain a collar. Embodiments of the present invention can be mounted onto engines which are being tested while on the ground but are not attached to an aircraft.

In one embodiment, a deflector for an aircraft engine comprises a screen attached to a base, a connector connecting the base and the engine, a mechanism to limit the movement of the connector and base, a spring that has two ends, one end being attached to the base inside surface, the spring extending past the base, and the spring's other end is positioned proximate the screen; and a shock absorbing means attached to the base, and connects the base with the engine, whereby when a foreign object contacts the deflector with a force sufficient force to move the spring and the shock absorbing means, the screen, the spring and the shock absorbing means are urged towards the engine, the movement of the screen and the spring being controlled by the shock absorbing means and the limiting mechanism, preventing the foreign object, such as a bird, from entering the engine.

The arrows A shown on mounting base 40 indicate the direction of movement of the deflector upon impact with a foreign object, such as a bird.

Figure 4:
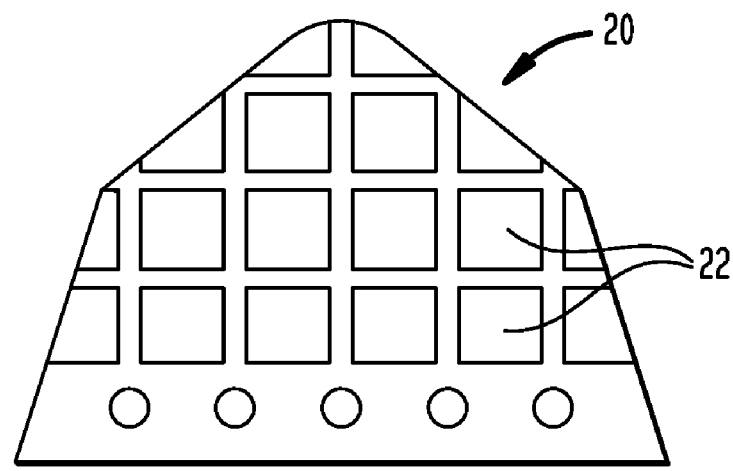

FIG. 4 illustrates a molded baffle screen.

Figure 5:
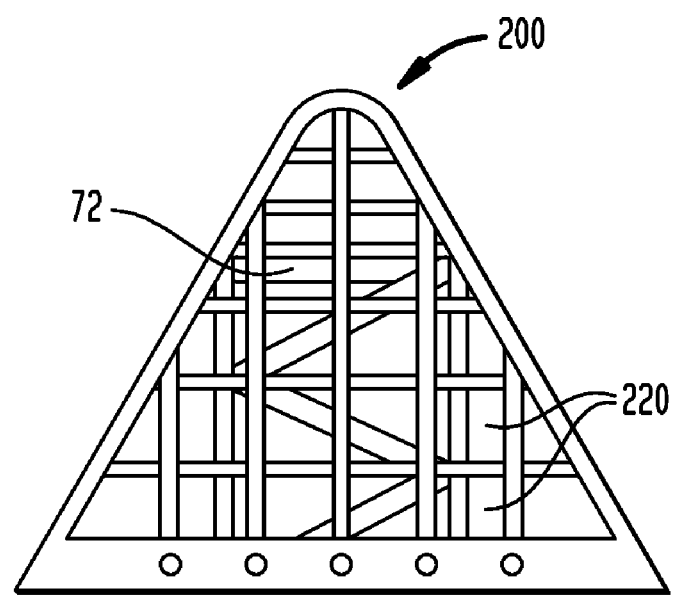

FIG. 5 illustrates a second embodiment of a baffle screen.

Figure 6:
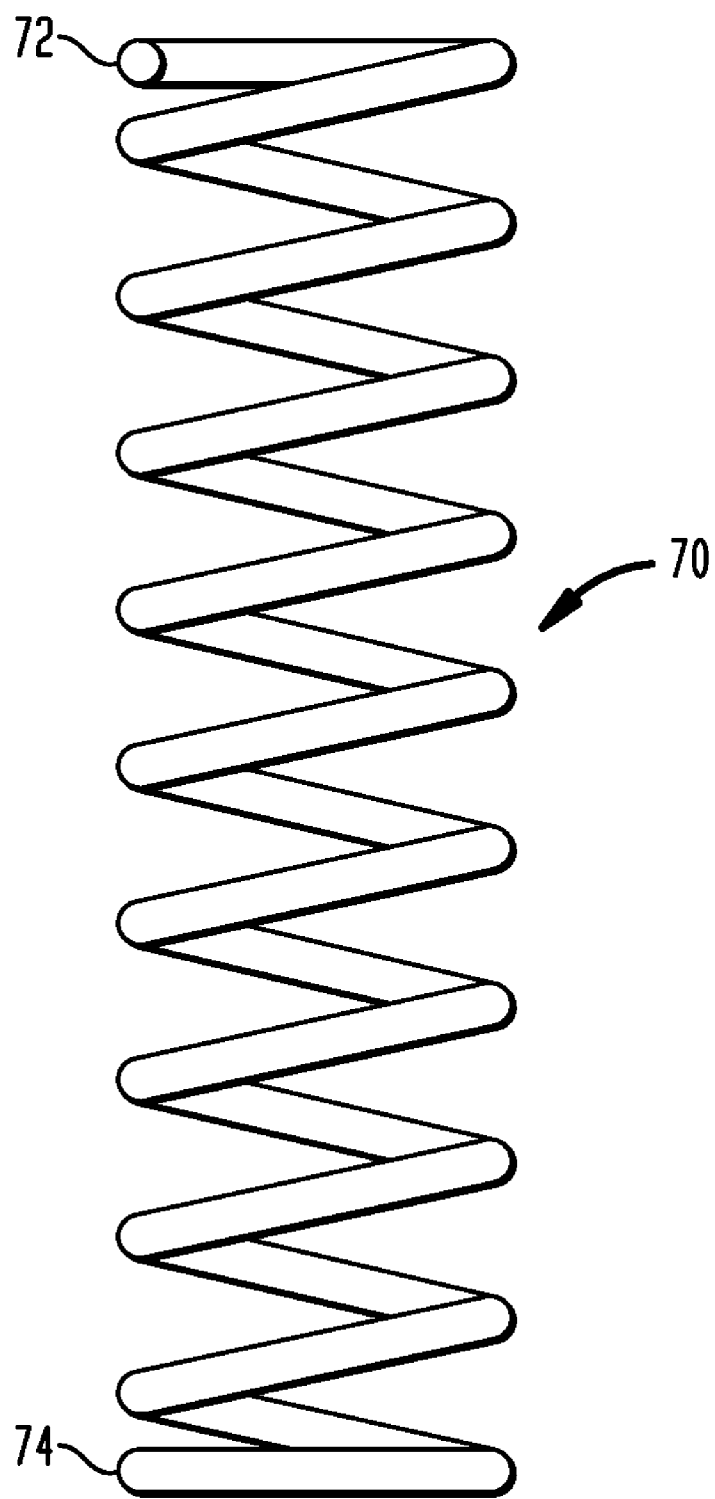

FIG. 6 illustrates an embodiment of the spring.

Figure 1:
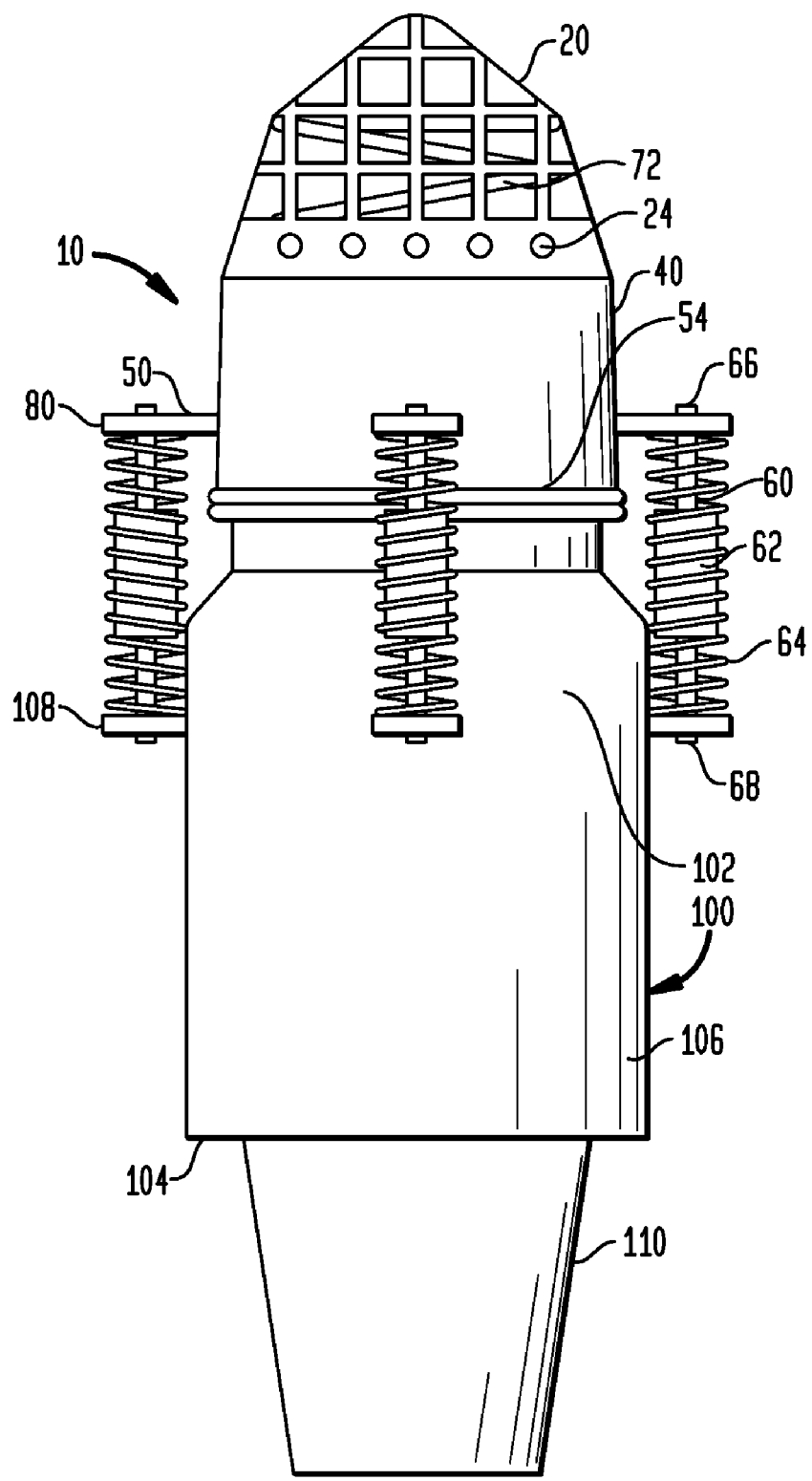
FIG. 1 is a plan view of an embodiment of the present invention; fairings are not illustrated.
Figure 2:
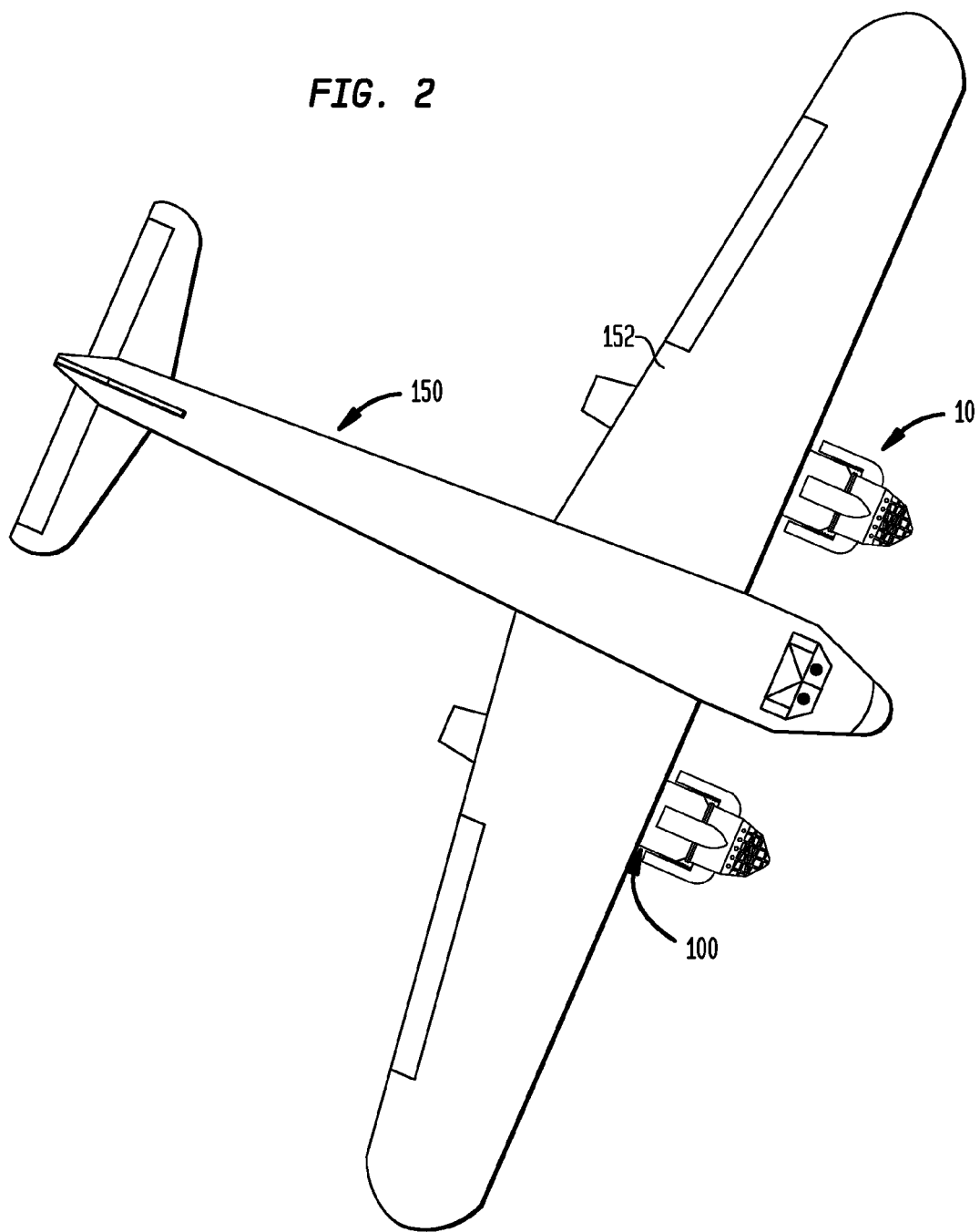
FIG. 2 illustrates an aircraft equipped with embodiments of the present invention on each jet engine.
Figure 7:
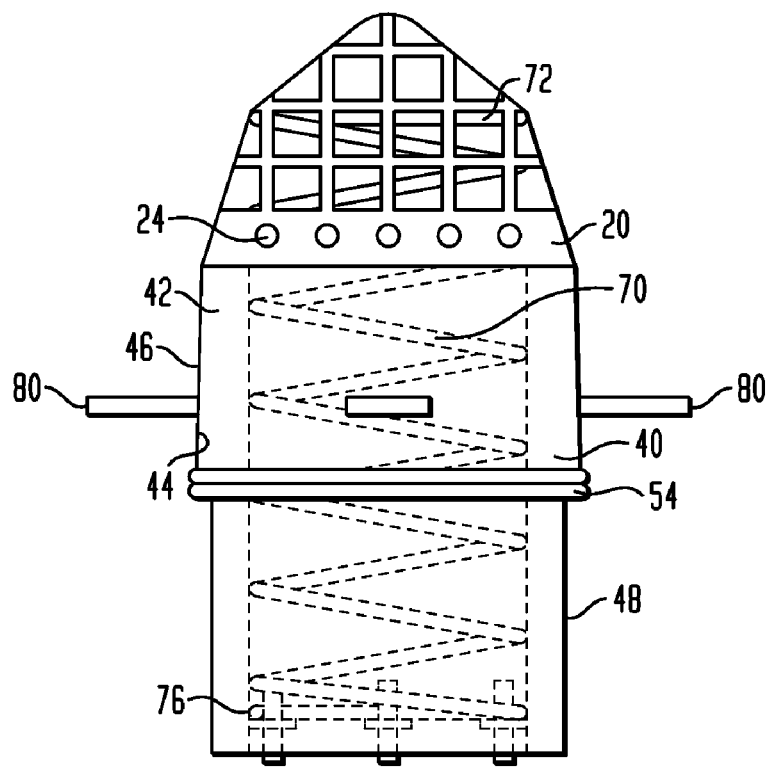

FIG. 7 is a side view of the embodiment of FIG. 1.

Figure 8:
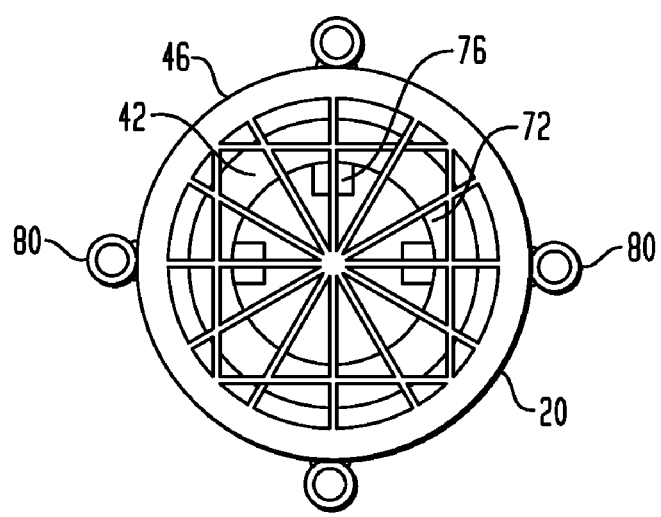

FIG. 8 is a top view of the embodiment of FIG. 7.

Figure 9:
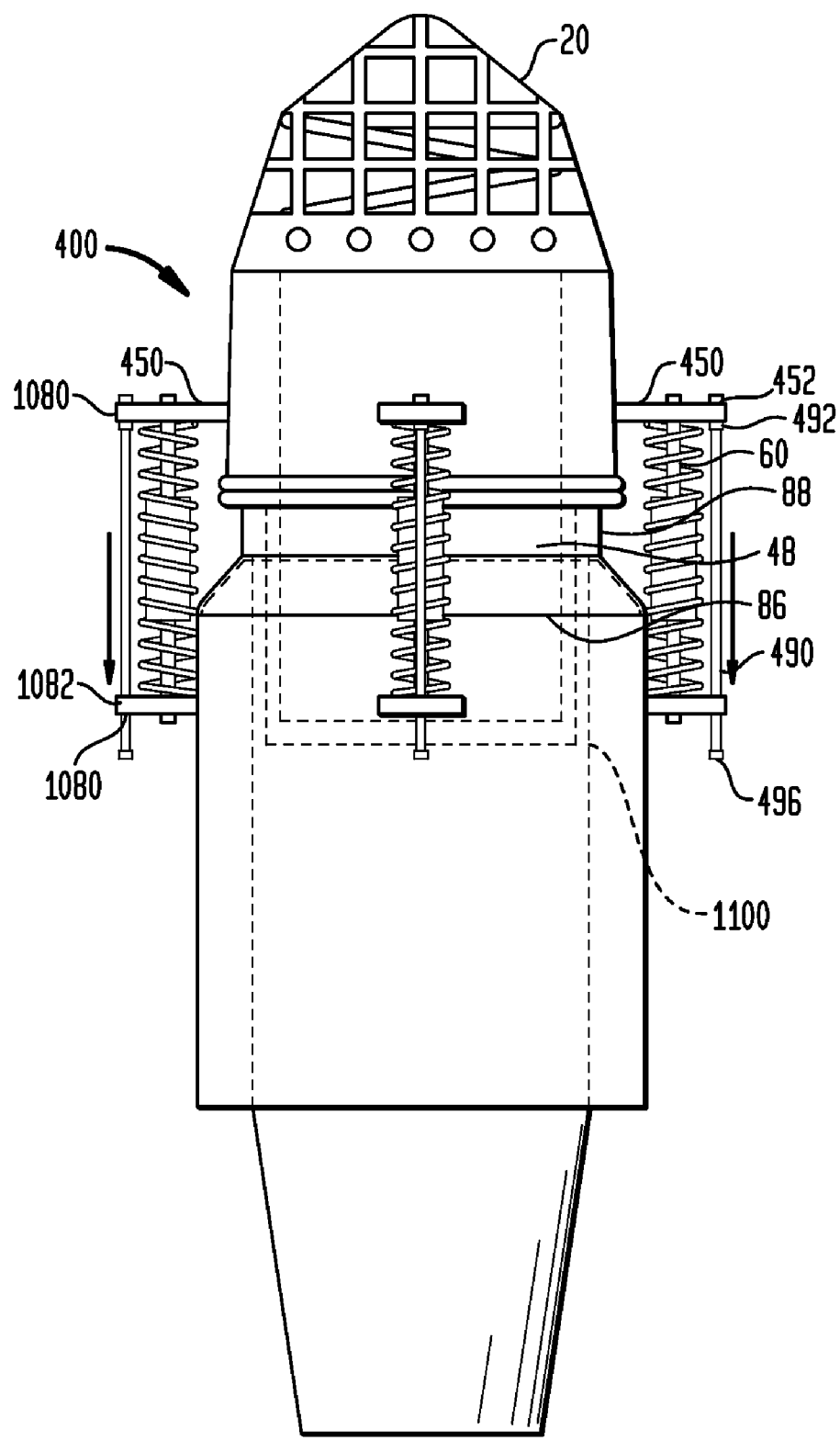

FIG. 9 illustrates an alternative embodiment of the foreign object deflector. The arrows A shown on mounting base 40 indicate the direction of movement of the deflector upon impact with a foreign object.

Figure 10:
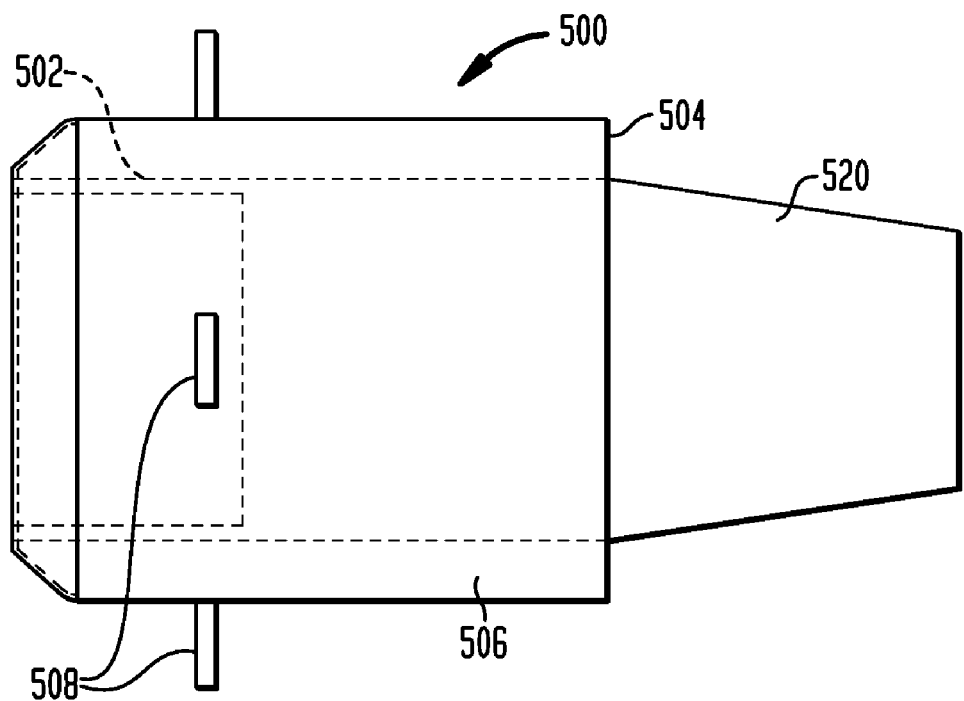

FIG. 10 shows a plan view of an alternate aircraft engine embodiment.

Figure 11:
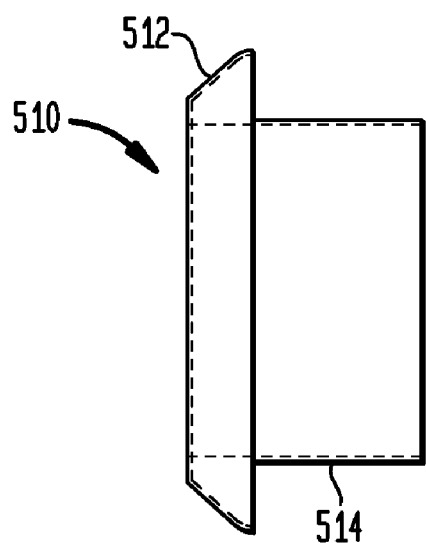

FIG. 11 illustrates the collar from the engine shown in FIG. 10.

Figure 12:
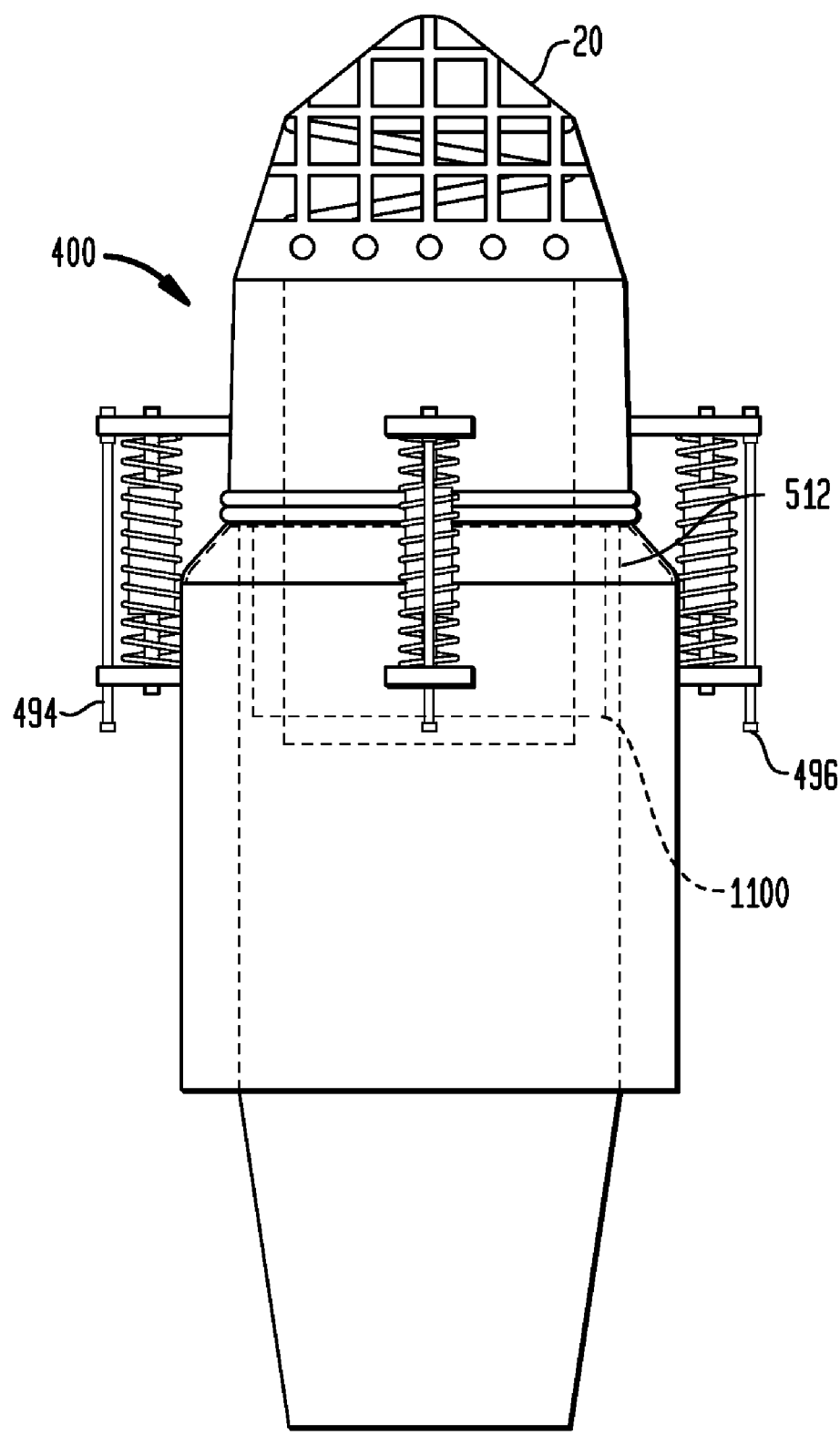

FIG. 12 illustrates another alternative embodiment of the foreign object deflector, on the engine embodiment from FIG. 10. The arrows A shown on mounting base 40 indicate the direction of movement of the deflector upon impact with a foreign object.

DETAILED DESCRIPTION OF THE INVENTION

Embodiments of the present invention are designed to be used in conjunction with aircraft engines, and primarily in conjunction with jet aircraft engines. These embodiments are intended to be used when the engine is in an off condition, at idling speed, or running at various levels of power output, including levels of high thrust needed for takeoff. These embodiments could be used on aircraft used for civilian and/or military purposes. In addition to their use on fixed wing aircraft, such as jet planes, embodiments of the present invention could be adapted for use on rotor craft (also referred to as rotary-wing aircraft), such as helicopters, and other airframes that are capable of vertical take-offs and landings.

An embodiment of the foreign object deflector 10 is shown attached to an engine 100 (FIG. 1). In one embodiment, deflector 10 is shown mounted on an aircraft 150 which has its engines 100 mounted beneath the aircraft wing 152. Although not shown in the drawings, foreign object deflector 10 could also be mounted on an aircraft whose engines are mounted elsewhere, such as between the tail and fuselage (for example, as on the Boeing 727 aircraft), mounted external to the fuselage (for example, as in the A-10 Thunderbolt aircraft), or other aircraft whose engines are mounted within the fuselage, for example, fighter aircraft.

Figure 3:
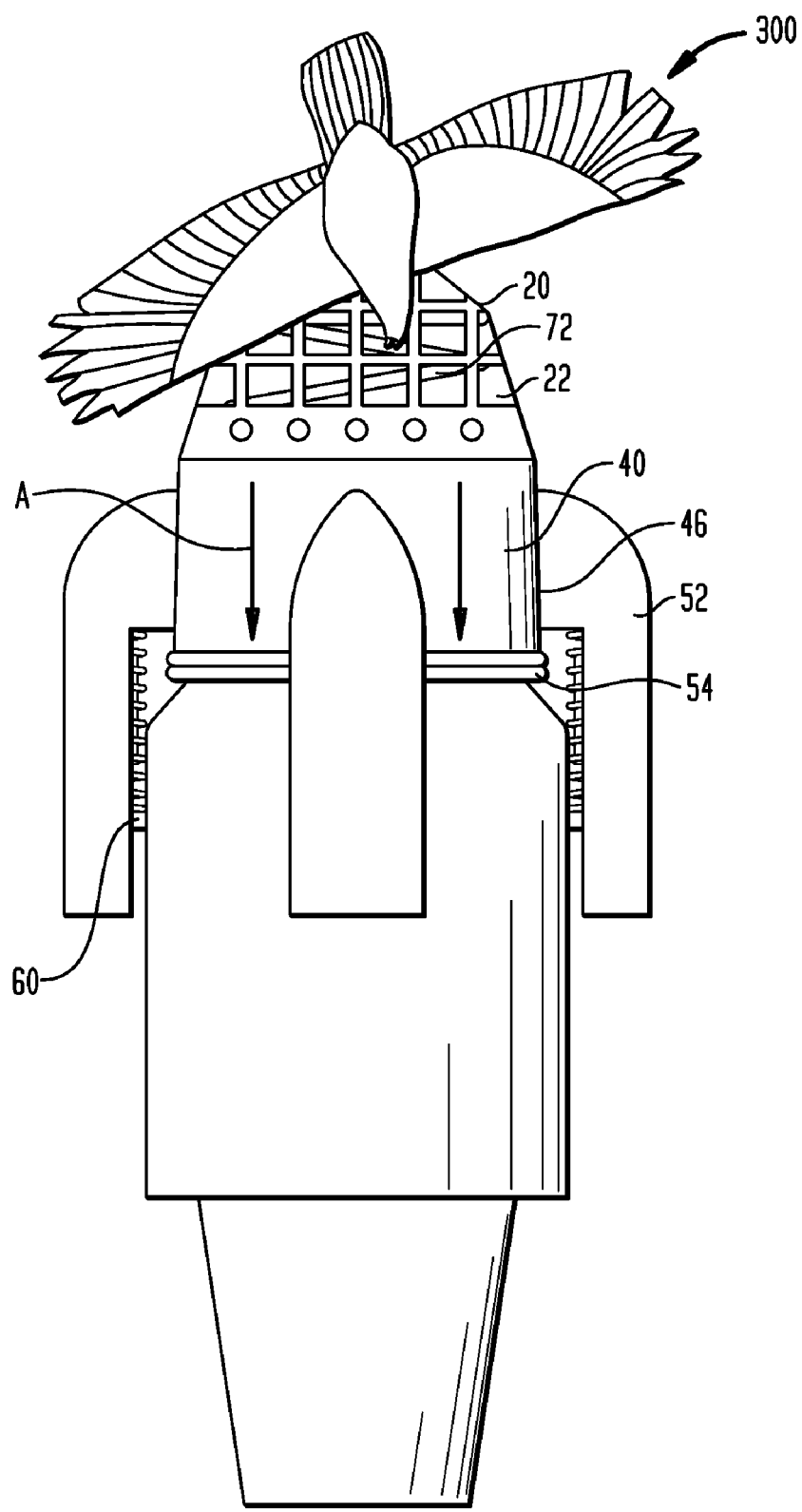
FIG. 3 illustrates the embodiment of FIG. 3 in the "impact" mode.

Foreign object deflector 10 comprises a baffle screen 20, a mounting base 40, and a fastening means 80 to fasten the deflector 10 to the engine 100. The deflector 10 shown in FIG. 1 is illustrated in its "normal" position, i.e., at it would be while the engine is off, or operating, but without having made contact with any external object, such as a bird 300 (FIG. 3).

The engine 100 can be any jet engine, currently used or to be developed in the future, which can be used to power an airframe, such as a fixed-wing aircraft, rotor craft such as helicopters, and other airframes that are capable of vertical take-offs and landings. Some details concerning aircraft engine components will be provided and shown herein for illustrative purposes; other details that are common knowledge to those skilled in the art will be omitted.

The baffle screen 20 includes a plurality of openings 22, the openings 22 being of a size sufficient to allow adequate airflow into the engine 100, yet small enough to prevent a foreign object from entering the engine. The baffle screen 20 can be manufactured from any suitable material, and materials such as rubber, plastic, carbon fiber, aluminum, titanium or other materials could be used. The baffle screen 20 needs to be sufficiently hard to withstand the impact of a foreign object while the aircraft is traveling at subsonic or supersonic speeds, yet be sufficiently flexible to allow some deformation thereof when an impact occurs. The configuration and number of the openings 22 in the baffle screen 20 will vary based upon manufacturing parameters.

Baffle screen 20 is fastened to the baffle screen mounting base 40 using a plurality of fasteners 24. The fasteners 24 can be any type of fastener used in the industry, and could include the use of adhesives or welding or other means for joining materials known to those skilled in the art. In one embodiment, the fasteners 24 are rivets; alternatively, and for example only, other fasteners such as screws, bolts and nuts, and the like could also be utilized.

The baffle screen 20 is not fastened to the spring first end 72, bur rather nests near the end of the spring 70. If the baffle screen 20 employed is manufactured of a metal, spring first end 72 should be coated with a rubber compound or the like to prevent any sparking or other adverse events that could occur because of metal to metal contact during operation of the foreign object deflector 10.

A second embodiment of the baffle screen 200 (FIG. 5) has a different configuration than baffle screen 20, the first embodiment 20 being a molded rubber, while the second embodiment 200 is manufactured from a metal, such as, for example only, stainless steel or titanium. It is believed that the second embodiment 200 will offer less drag and facilitate better airflow into the engine 100 than the molded embodiment 20. Baffle screen 200 further includes a plurality of openings 220, the openings 220 being of a size sufficient to allow adequate airflow into the engine 100, yet small enough to prevent a foreign object from entering the engine. The configuration and number of the openings 220 in the baffle screen 200 will vary with manufacturing and design considerations.

The mounting base 40 comprises a housing 42, an inner surface 44, an outer surface 46, and a connector 48 to connect the housing to the engine 100. The connector 48 may be formed as an extension of, but integral component of, the housing 42, or may be a separate component that is fastened within housing 42. The housing 42 has a generally hollow configuration (FIGS. 7-8). Outer surface 46 has a plurality of attachment means 50, and a plurality of fairings 52. The attachment means 50 each receive a shock absorber 60, and each shock absorber 60 is covered by a fairing 52. The embodiment shown in FIG. 1 has four shock absorbers 60 and four fairings 52. However, it is to be understood that the number of shock absorbers 60 and fairings 52 is not limited to either the number or arrangement shown herein; there should be an equal number of shock absorbers and fairings. The shock absorbers 60 function to absorb and distribute the force of impact from the foreign object, with the impact being distributed as equally as possible from the baffle screen and housing towards the engine. Thus, the actual number of shock absorbers and fairings can vary from the number illustrated herein, depending upon manufacturing and design considerations. The fairings are mounted such that they are easily removable by maintenance personnel for servicing the shock absorbing mechanism 60. The fairings are not shown in detail, as their structure is known to those skilled in the art.

Connector 48 is slidably positioned away from engine 100, and the movement of connector 48 is limited by means of a limiting means 54, which, as shown in the drawings, is a gasket 54, such as, but not limited to, one or more O-rings. A strip of rubber, plastic, or other material which can limit the movement of the connector could also be utilized. To facilitate the movement of the connector 48 within the engine cowling, the outside surface of the connector 48 is coated with a lubricant or lubricating coating. In the embodiment described herein, the lubricant can be a silicone lubricant. Depending upon manufacturing conditions, and the particular combination of engine 100 and bird deflector 10, gasket 54 may need to be altered, either in thickness or in number, such as by utilizing one or more O-rings, as appropriate.

The baffle screen mounting base 40 can be manufactured from any suitable material; in general, this will be aircraft aluminum, but materials utilized in aircraft manufacture, such as but not limited to carbon fiber composites, titanium, or other materials, could also be substituted therefor, depending upon the ultimate purpose of the aircraft and manufacturing and design constraints.

A representative shock absorbing mechanism 60 (FIG. 1) comprises a shock absorber 62 and a helper spring 64. An example of a shock absorber is the hydraulic type of shock absorber commonly found on many types of vehicles. Shock absorber 62 includes a first end 66 and a second end 68. First end is retained by fastening means 80, and second end retained by fastening means 108, the latter being attached to the engine cowling 102 and the former being attached to the baffle screen mounting base 40. The shock absorber ends 66 and 68 are attached using fasteners (not shown) known to those skilled in the art, and can include, for example only, screws, nuts and bolts, pivot pins, rods, cotter pins and the like.

The components of the shock absorbing mechanism 60 need to be of sufficient strength to override the suction of the engine In one embodiment, the helper spring 64 can be manufactured from a material such as stainless steel, although other materials commonly used in the manufacture of springs, such as steel, titanium or other metals could also be utilized. The helper spring 64 may be further coated with a protective material, to protect against corrosion by water or other environmental substances. The protective material could be a water-repellant spray, such as, for example, a silicone-based agent, or the protective material could be a coating of paint, a rubber or rubberized material, or other suitable agents. The dimensions of the spring 64, the gauge of the material used to manufacture it, the length of the spring, and the thickness of any coating that will be applied thereto are parameters that can be determined by those skilled in the art based upon manufacturing and design considerations, and will not be described further The engine 100 includes a cowling 102 that has an inner surface 104 and an outer surface 106, and a plurality of fastening mean 108 on the outer surface to receive an end of shock absorber 60. The engine 100 also includes an exhaust means 110.

FIGS. 5-6 show the presence and arrangement of a spring 70 within deflector 10. Spring 70 has a first end 72 and a second end 74, and the spring is retained within housing 42. Under normal operating conditions, the spring 70 is in an uncompressed state, and first end 72 extends past housing 42 to where first end 72 is positioned beneath baffle screen 20. First end 72 generally will be in direct contact with baffle screen 20, but a gap 1100 may develop between the first end 72 and the baffle screen 20, particularly as the deflector 10 and its components, such as the baffle screen 20 and spring 70 age. It is anticipated that a gap 1100, not exceeding 2 inches, would not adversely affect the performance of the deflector, and the widening of the gap would indicate that the deflector 10 requires maintenance Second end 74 of spring 70 is retained within housing 42 by means of fasteners 76 that attach to inside surface 44. The fasteners 76 used in one embodiment are "U"-bolts that are attached to the inside surface, in a manner known to those skilled in the art. Other types of fastening means, known to those skilled in the art, for attachment of a spring to a surface can also be utilized, provided that the spring is able to be compressed upon impact of the deflector 10 with a foreign object. To minimize any sparking or other adverse events that result from metal to metal contact, the fasteners 76 could be covered with either an anticorrosion and/or antifriction coating, for example, a rubber coating, such as by dipping the fastener into a coating material, or coated with another type of fire-resistant or fire-proof coating. The spring 70 could be covered with a similar type of anticorrosion or antifriction coating, for example, a rubber coating, such as by dipping the spring into a coating material, or coated with another type of resilient, fire-resistant or fireproof coating, such as those commonly used in aircraft or other types of construction. Another alternative is to employ a baffle screen 20 manufactured from rubber or a similar material, or to use a metal baffle screen that is coated with a material similar to that used to coat the spring.

FIGS. 7-8 show a side and a top view, respectively, of the baffle screen base assembly; the first end 72 of spring 70 is shown near baffle screen 20, while the remainder of spring 70 is shown in phantom within baffle screen mounting assembly 40. For ease of viewing, the fairings 52 are not shown in these figures.

During normal flight conditions, the foreign object deflector 10 appears as is shown in FIG. 1. When a foreign object, such as a bird, impacts the deflector 10 and the baffle screen 20, the lower portion of the mounting base housing 42 will slide into the engine cowling 102. The baffle screen 20 becomes compressed, the spring 70 becomes compressed, and the shock absorbers 60 become compressed, such that the mounting base housing 42 slides into the cowling 102. The gaskets 54 limit the movement of the mounting base 40 within the engine, and the gaskets 54 also absorb some of the shock caused by the impact of the foreign body on the deflector device 10. The severity of the impact will determine the extent of movement of the baffle screen mounting base in relation to the engine cowling.

After impact, the baffle mounting base should return to the "Normal Mode" (FIG. 1) with the aid of the shock absorbers and helper springs. Depending upon the impact, the foreign object may or not be retained on the baffle screen, but the foreign object is prevented from entering the engine.

The baffle screen 20 can be manufactured from any suitable material, and materials such as rubber, plastic, carbon fiber, aluminum, titanium, KEVLAR®, aramid, or other materials could be used. The baffle screen 20 needs to be sufficiently hard to withstand the impact of a foreign object while the aircraft is traveling at subsonic or supersonic speeds, yet be sufficiently flexible to allow some deformation thereof when an impact occurs. The baffle screen 20 further includes a plurality of openings 22, the openings 22 being of a size sufficient to allow adequate airflow into the engine 100, yet small enough to prevent the foreign object from entering the engine. The configuration and number of the openings 22 in the baffle screen 20 will vary with manufacturing parameters.

Another embodiment of foreign object deflector 400 comprises a baffle screen 20, a mounting base 40, and a fastening means 1080 to fasten the deflector 400 to the engine 100. The deflector 400 shown (FIG. 9) is in the "Normal Mode".

Most components of this alternate deflector embodiment 400 are identical to those of the first deflector embodiment 10, and in general, where the components are identical the same reference numerals will be used.

A difference between this alternate deflector embodiment 400 and the first deflector embodiment 10 is the addition of a stabilizer 490 to the shock absorbing mechanism 60 (FIG. 9).

The housing 42 has a generally hollow configuration, and outer surface 46 has a plurality of attachment means 450, and a plurality of fairings (not shown). The attachment means 450 each receive a shock absorbing means 60 and a stabilizer 490; and each shock absorbing means 60-stabilizer 490 combination is covered by a fairing (not shown). The ends 492 and 494 of stabilizer 490 are threaded, and first end 492 (also referred to as the deflector end) is received through opening 452, and retained thereon by a fastener 496. The fastener 496 can be a threaded fastener, such as a nut, a cap nut, or combination of other fasteners. In the embodiment illustrated, one fastener 496 is a nut and a second fastener 496 is a cap nut, the nut 496 on one side of the attachment means 450, and the cap nut 496 on the deflector side of the attachment means 450. In the embodiment illustrated, the fastener 496 is a cap nut, which because of its' shape also improves the airflow over the stabilizer. The fastener can be further modified to have other configurations that will further improve the aerodynamics of this component of the present invention.

The stabilizer 490 can be manufactured from materials commonly used for aircraft construction, and can include, for example only, metals such as stainless steel, aluminum, titanium, or combinations thereof, or combinations of metal with other materials such as carbon fiber or other types of composite materials.

The other end 494 (also referred to as the engine end) of stabilizer 490 is slidably retained within a bushing 1082 (shown in phantom) mounted within the retaining bar 1080 that extends from engine 100. The second end 494 is retained by a fastener 496. The fastener 496 can be a threaded fastener, such as a nut, a cap nut, or combination of other fasteners. In the embodiment illustrated, the fastener 496 is a cap nut.

The bushing can be manufactured from materials commonly used for this purpose, and can include, for example only, silicone, nylon, rubber, plastic, carbon fiber, or combinations thereof, or other types of composite materials.

Shock absorber 62 includes a first end 66 and a second end 68. First end is retained in fastening means 950, and second end retained by fastening means 1080, the latter being attached to the engine cowling 102 and the former being attached to the baffle screen mounting base 40. The helper spring 64, in an uncompressed state, is positioned between the fastening means 950 and 1080, and the helper spring's ends can also be attached thereto. The shock absorber ends 66 and 68 are attached using fasteners (not shown) known to those skilled in the art, and can include, for example only, screws, nuts and bolts, pivot pins, cotter pins and the like.

The portion of the connector that slides into the cowling should have an outer diameter smaller than the inner diameter of the cowling, in order to avoid any metal-to-metal contact. In one embodiment, there can be a gap 1100 between the two ranging from about ⅛ to about 1 inch. In another embodiment, the gap can range from about ¼ to about ¾ of an inch. In yet another embodiment, the gap can range from about ¼ to about ⅝ of an inch. In still another embodiment, the gap can range from about ⅜ to about ⅝ of an inch. To minimize friction between the components, the inside surface 504 of the cowling should be coated with a lubricant, such as a rubberized material. The connector 48 has an inner surface 86, and an outer surface 88 that should be coated with the same lubricant.

This alternate deflector embodiment 400 is illustrated with four (4) shock absorbers and stabilizers, and four (4) fairings. It is to be understood that the number of shock absorbers 60, stabilizers 490 and fairings is not limited either the number or arrangement shown herein; there should be an equal number of shock absorbers, stabilizers and fairings. The shock absorbers 60 function to absorb and distribute the force of impact from the foreign object, with the impact being distributed as equally as possible from the baffle and housing towards the engine. Thus, the actual number of shock absorbers and fairings can vary from the number illustrated herein, depending upon manufacturing and design considerations. The fairings are mounted such that they are easily removable by maintenance personnel for servicing the shock absorbing mechanism 60. The fairings are not shown in detail, as there structure is known to those skilled in the art.

An alternate embodiment of a jet engine in shown in FIGS. 10-11. In this embodiment, engine 500 includes a cowling 502 that has an inner surface 504 and an outer surface 506, and a plurality of fastening mean 508 on the outer surface to receive an end of shock absorber 60. The engine 500, partially shown in phantom in FIG. 10, includes an exhaust means 520. This embodiment also employs a collar 510 (shown in FIG. 10 in phantom) comprising an annular ring 512 connected to an annular body 514, the body 514 being sized to receive and slidably receives foreign object deflector 10 or 400. The collar 510 is fastened to the cowling 502 by means known to those skilled in the art, such as by rivets, screws, nuts and bolts, and the like. The inner surface of collar 510 can be coated with a lubricant to facilitate movement of the foreign object deflector 10 or 400, and minimize friction and/or any fire risk that may be attributable to metal-to-metal contact. An alternative lubricant can be a rubberized coating on the inner surface of the collar 510, and a similar coating on the cooperating surfaces of the connector. The collar 510 could be used to stabilize the movement of foreign object deflector 10 or 400 once it has been mounted on the engine 500.

FIG. 12 illustrates the mounting of an alternate embodiment of deflector 400 attached to an alternate embodiment of engine 500 which contains a collar 510.

Embodiments of the present invention can be used either to retrofit jet engines currently used on aircraft, or could be built onto newer engines during the manufacturing process.

Although this invention has been described with a certain degree of particularity, it is to be understood that the present disclosure has been made only by the way of illustration, and that numerous changes in construction and arrangement of parts may be resorted to without departing from the spirit and scope of the invention.

I claim:

1. A foreign object deflector for an aircraft engine, the deflector comprising:
   a base having an inner surface and an outer surface, the base being generally hollow;
   a screen, the screen being attached to the base by a means for fastening;
   a connector, the connector having a generally configuration, the connector having a first end and a second end, the first end attached to the base, and the connector second end sized to slidably fit in the engine;
   a spring, the spring having a main body, a first end and a second end, the spring second end being attached to the base inside surface, the spring main body extending past the base, the spring second end being positioned proximate the screen; and
   a shock absorbing means, the shock absorbing means attached to the base and connecting the base with the engine, whereby when a foreign object contacts the deflector with a force sufficient to move the spring and the shock absorbing means, the screen, the spring and the shock absorbing means are urged towards the engine, the movement of the screen and the spring being controlled by the shock absorbing means, and the foreign object is prevented from entering the engine.

2. The deflector as described in claim 1, wherein the connector further comprises a means for limiting movement of the deflector.

3. The deflector as described in claim 2, wherein the means for limiting movement comprises one or more O-rings.

4. The deflector as described in claim 1, wherein the shock absorbing means is attached to the base outer surface and attached to the engine outer surface.

5. The deflector as described in claim 4, further comprising an attachment bar, the attachment bar attaching the shock absorbing means to the base and to the engine.

6. The deflector as described in claim 4, wherein the shock absorbing means is a shock absorber.

7. The deflector as described in claim 6, wherein the shock absorbing means further comprises a helper spring, the helper spring being positioned around the shock absorber.

8. The deflector as described in claim 2, wherein the spring is coated with an anticorrosion and antifriction coating.

9. The deflector as described in claim 1, wherein the screen is manufactured from one or more materials selected from the group consisting of rubber, stainless steel, aluminum, carbon fiber and titanium.

10. The deflector as described in claim 4, further comprising a stabilizer bar, the stabilizer bar being attached to the base and connecting the base with the engine.

11. The deflector as described in claim 10, wherein the stabilizer bar is slidably mounted and is generally parallel to the shock absorbing means.

12. The deflector as described in claim 2, wherein the aircraft is chosen from the group consisting of fixed wing aircraft, vertical take-off and landing aircraft and rotary wing aircraft.

13. The deflector as described in claim 4, further comprising a fairing, the fairing covering the shock absorbing means, and the fairing being attached to the base and the engine.

14. A foreign object deflector for an aircraft engine, the deflector comprising:
    a base having an inner surface and an outer surface, the base being generally hollow;
    a screen, the screen being attached to the base by a means for fastening;
    a connector, the connector having a generally configuration, the connector having a first end and a second end, the first end attached to the base, and a means for limiting movement, the first end being attached to the base, and the connector second end sized to slidably fit in the engine;
    a spring, the spring having a main body, a first end and a second end, the spring second end being attached to the base inside surface, the spring main body extending past the base, the spring second end being positioned proximate the screen; and
    a shock absorbing means, the shock absorbing means attached to the base and connecting the base with the engine,
    a stabilizer bar, the stabilizer bar being attached to the base and connecting the base with the engine, the stabilizer bar being slidably mounted and generally parallel to the shock absorbing means,
    whereby when a foreign object contacts the deflector with a force sufficient to move the spring and the shock absorbing means, the screen, the spring and the shock absorbing means are urged towards the engine, the movement of the screen and the spring being controlled by the shock absorbing means, and the foreign object is prevented from entering the engine.

15. The deflector as described in claim 14, wherein the spring is coated with an anticorrosion and antifriction coating.

16. The deflector as described in claim 14, wherein the screen is manufactured from one or more materials selected from the group consisting of rubber, stainless steel, aluminum, carbon fiber and titanium.

17. A foreign object deflector for an aircraft engine, the deflector comprising:
    a base having an inner surface and an outer surface, and an attachment bar extending from the outer surface, the base being generally hollow;
    a screen, the screen being attached to the base by a plurality of fasteners;
    a connector, the connector having a generally configuration, the connector having a first end and a second end, and a means for limiting movement, the first end being attached to the base, and the connector second end sized to slidably fit in the engine;
    a spring, the spring having a main body, a first end and a second end, the spring second end being attached to the base inside surface by a means for attaching, the spring main body extending past the base, the spring second end being positioned proximate the screen; and
    a shock absorbing means, the shock absorbing means attached to the base outer surface by the attachment bar and attached to the engine outer surface by a second attachment bar; whereby when a foreign object contacts the deflector with a force sufficient to move the spring and the shock absorbing means, the screen, the spring and the shock absorbing means are urged towards the engine, the movement of the screen and the spring being controlled by the shock absorbing means, and the foreign object is prevented from entering the engine.

18. The deflector as described in claim 17, wherein the spring is coated with an anticorrosion and antifriction coating.

19. The deflector as described in claim 17, wherein the screen is manufactured from one or more materials selected from the group consisting of rubber, stainless steel, aluminum, carbon fiber and titanium.

20. The deflector as described in claim 17, wherein the shock absorbing means further comprises a helper spring, the helper spring being positioned around the shock absorber.

\* \* \* \* \*